3,029,243
PREPARATION OF DIHYDROAGROCLAVINE FROM A MIXTURE OF AGROCLAVINE AND ELYMOCLAVINE
Stephen M. Olin, Elkhart, Ind., assignor to Miles Laboratories, Inc., Elkhart, Ind., a corporation of Indiana
No Drawing. Filed June 29, 1960, Ser. No. 37,030
6 Claims. (Cl. 260—285.5)

This invention relates to a process for the preparation of a physiologically very active ergot alkaloid by conversion of a mixture of ergot alkaloids, obtained as an ergot fermentation product. More specifically, this invention pertains to a process for the preparation of dihydroagroclavine from a mixture of agroclavine and elymoclavine in a simple and convenient one-step procedure which involves, on the one hand, the hydrogenation of agroclavine and, on the other hand, the hydrogenation and hydrogenolysis of elymoclavine in the presence of a platinum catalyst.

Ergot alkaloids, especially ergonovine (ergometrine) and the peptide alkaloids, ergotamine, ergosine and the ergotoxins, have been known heretofore to be excellent therapeutic agents. The major therapeutic uses of these ergot alkaloids fall into the following categories: application in obstetrics, treatment of migraine and treatment of hypertension. For example, both ergometrine and ergotamine in their commercial forms as maleate and tartrate, respectively, are used as oxytocic agents to induce labor, to control post-partum hemorrhage, and to hasten the normal involution of the uterus, while ergotamine is also useful in the treatment of migraine headaches. In addition, ergot alkaloids have numerous miscellaneous therapeutic uses. However, it is difficult to procure sufficient quantities of these valuable ergot alkaloids at low prices since for the most part they have hitherto been obtainable only from hand-picked, crude ergot of rye in seasonable operations.

Recently, methods of producing ergot alkaloids by fermentation in cultures have been discovered (U.S. Patent Nos. 2,809,920, 2,835,675 and 2,936,266). While it has been the object of these fermentation processes to produce the pharmacologically more active alkaloids, ergonovine and ergotamine, the yields of these commercial alkaloids obtained by the practice of these processes, even if modified, have been disappointing. For this reason, none of these alkaloids have thus far been produced in any quantity by culture, and no commercial fermentation process for any of these alkaloids is known to be in operation at the present time.

However, it has been found that appreciable quantities of clavine-type alkaloids can be obtained in such a fermentation process which utilizes certain strains of *Claviceps purpurea* in saprophytic cultures. In one specific embodiment of this general process a mixture of clavine alkaloids is obtained which consists principally of agroclavine and elymoclavine with minute quantities of setoclavine, penniclavine, etc.

However, neither agroclavine nor elymoclavine is comparable in pharmacological activity to ergonovine or ergotamine. It has been found that partial hydrogenation or rearrangement, but particularly partial hydrogenation, increases the therapeutic effect of these clavine-type ergot alkaloids. Dihydroagroclavine, for example, exhibits superior oxytocic activity, being about five times more active than ergonovine on a weight basis.

The respective median oxytocic concentrations (OC50) for these ergot alkaloids as determined in vitro on rabbit uterus, taking the OC50 for ergonovine, which was found to be 1.6 mcg./ml., as the standard with a rating of 1, are as follows: dihydroagroclavine, 5.3; agroclavine, 0.7; ergotamine, 0.3; and elymoclavine, 0.2. Moreover, in vivo tests, wherein dihydroagroclavine was administered intravenously in anesthesized dogs, have also shown its effectiveness in causing uterine contractions, particularly in the postpartum dog. It was found that it also causes hypotension at 4 mg./kg. at the same time.

I have now found that the mixture of agroclavine and elymoclavine obtained as fermentation product may be treated in one convenient operation to produce dihydroagroclavine without having first to separate the two precursors for individual transformation into the desired therapeutically most active clavine alkaloid, dihydroagroclavine. This is, of course, of great commercial significance in view of the pharmacological activity shown by dihydroagroclavine.

Separation of these alkaloids requires a chromatographic technique such as that taught by U.S. Patent No. 2,835,675. This technique, however, is not compatible with large scale production as it has distinct disadvantages, e.g. the amount of material that can be fractionated at one time is limited by the size of the column used and, due to the proximity in their respective rates of descent in the column, an overlapping of the alkaloids results in an incomplete separation of the compounds.

More specifically, I have now found that under the reducing conditions described below agroclavine is transformed to dihydroagroclavine by the addition of a mole of hydrogen to the 9,10-ethylenic double bond while at the same time elymoclavine undergoes hydrogenolysis of its allylic alcohol group in addition to the reduction of the 9,10-ethylenic double bond. The latter requires two moles of hydrogen. The simultaneous double hydrogenation and hydrogenolysis under the given reducing conditions is completely surprising and unexpected as well as novel in alkaloid chemistry. This is surprising since in analogy to the partial reduction of agroclavine to dihydroagroclavine, the partial reduction of elymoclavine might be expected to result in dihydroelymoclavine but not dihydroagroclavine.

The inventive process may be illustrated by the following equations:

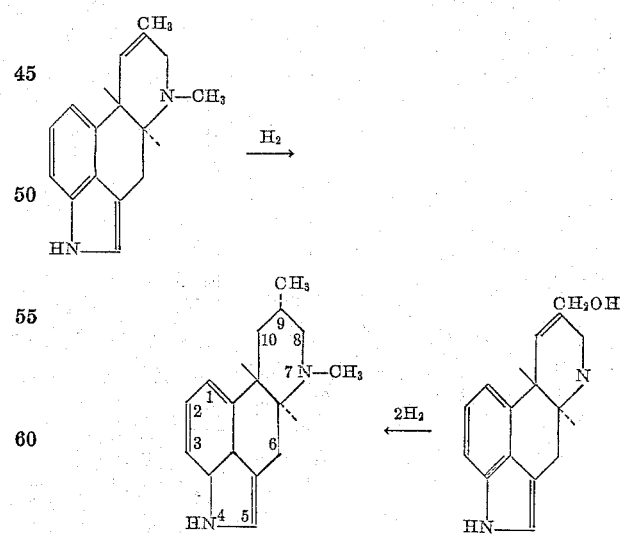

Reduction of the 9,10-double bond in both agroclavine and elymoclavine may lead to either α- or β-methyl derivatives. However, under the conditions employed in the present process, the reduction is stereospecific and yields almost exclusively the α-methyl isomer.

The reaction conditions which I have found to be suitable for carrying out this unexpected conversion are essentially use of platinum in acetic acid under moderate hydrogen pressure. Under moderate hydrogen pressure, a pressure of from 2 to 4, but preferably a pressure of 3 atmospheres of hydrogen, is to be understood. As is obvious to a man skilled in the art, these conditions can conceivably be altered to include other solvents, such as water with mineral acids, and other pressures, such as atmospheric pressure, and still be within the scope of this invention. However, use of a platinum catalyst is a requisite. For example, it has been found impracticable to replace platinum by Raney nickel, which is otherwise regarded as equivalent to platinum as a hydrogenation catalyst. Upon use of Raney nickel, dihydroelymoclavine is produced rather than the desired dihydroagroclavine.

The inventive process may be carried out in accordance with the following general procedure:

The sample of ergot alkaloid mixture (0.1 to 10 millimoles), platinum oxide (0.025 to 1.0 millimole), acetic acid (10 to 60 ml.) and magnetic stirrer are placed in a reduction flask (50 to 500 ml.) connected to a hydrogen source. There is a short induction period while the platinum oxide is being reduced to metallic platinum. The system is evacuated thrice to 0.1 atmosphere and is refilled with hydrogen after each evacuation. The temperature of the hydrogen gas is then allowed to come to room temperature and stirring is started. When the theoretical amount of hydrogen is taken up, stirring is discontinued. The catalyst is then removed by filtration, and the filtrate is concentrated under reduced pressure on a warm water bath. The residue is dissolved in a minimum of water and the solution made basic with sodium hydroxide. The alkaloids are extracted with chloroform-isopropyl alcohol (3:1) until the extracts give a negative test with Ehrlich's reagent. The combined extracts are concentrated to dryness under reduced pressure and the residue is either recrystallized from acetone and water or chromatographed on Fisher alumina (80–200 mesh) using absolute chloroform as the developer.

Example

One gram of a mixture of agroclavine and elymoclavine was dissolved in 60 ml. of glacial acetic acid and reduced under a pressure of 3 atmospheres of hydrogen over 0.1 g. of platinum oxide for 5 hours. The reduction mixture was filtered, the acetic acid was removed by distillation under reduced pressure and the residue was dissolved in 10 ml. of methanol. Ten ml. of chloroform was added and 50 mg. of potassium carbonate was used to neutralize the excess acetic acid. The filtered solution was concentrated and the residue was dissolved in absolute chloroform. This solution was put on a column and from the eluate was obtained after recrystallization from acetone and water 0.61 g. of the material. Yield: 61%; M.P. 243–244° C. Analysis.—Calcd. for $C_{16}H_{20}N_2$: N (basic), 5.83. Found: N (perchloric), 5.81.

In accordance with the above process description the following experiments were also conducted:

(1) A mixture of elymoclavine (12.3 mg.) and agroclavine (37.7 mg.) in 10 ml. of glacial acetic acid was hydrogenated over 5 mg. of platinum oxide at atmospheric pressure. After eighty minutes the reduction was complete and 35.0 ml. of hydrogen had been absorbed. The product, dihydroagroclavine, was identified by paper chromatography.

(2) A mixture of elymoclavine (36.9 mg.) and agroclavine (12.0 mg.) in 10 ml. of glacial acetic acid was hydrogenated over 5 mg. of platinum oxide at atmospheric pressure. After seventy minutes the reduction was complete and 52 ml. of hydrogen had been absrobed. The desired product was then identified by paper chromatography.

(3) A mixture of crude alkaloids isolated from a fermentation as described above was dissolved in acetic acid to form a solution containing 15 mg. of alkaloids/ml. Duplicate samples (10 ml.) of this solution were reduced in the equipment, in both runs 1.2 ml. of hydrogen was absorbed per mg. of alkaloid. The product, dihydroagroclavine, was identified by paper chromatography.

(4) Elymoclavine (128 mg., 0.5 millimole) was reduced in 10 ml. of glacial acetic acid, 5.4 ml. of hydrogen was absorbed per 0.1 millimole of elymoclavine. An 86% yield of dihydroagroclavine of M.P. 243–244° C. and as identified by paper chromatography, was isolated from the reduction mixture.

(5) Agroclavine (119 mg., 0.5 millimole) was reduced in 10 ml. of glacial acetic acid, 3.0 ml. of hydrogen was absorbed per 0.1 millimole of agroclavine. A 93% yield of dihydroagroclavine of M.P. 243–244° C. and as identified by paper chromatography, was isolated.

These additional experiments, in which known amounts of elymoclavine and/or agroclavine were used, attest to the operability of the inventive concept and corroborate my surprising and unexpected findings.

What is claimed is:

1. A process for the preparation of dihydroagroclavine by the conversion of a mixture of clavine alkaloids consisting essentially of agroclavine and elymoclavine which comprises hydrogenating said mixture dissolved in an acidic medium in the presence of platinum and isolating said dihydroagroclavine.

2. A process for the preparation of dihydroagroclavine from a mixture of clavine alkaloids consisting essentially of agroclavine and elymoclavine, which comprises treating said mixture, dissolved in an acidic medium, with hydrogen under a pressure of from 1 to 4 atmospheres for from 1 to 5 hours in the presence of platinum and isolating said dihydroagroclavine.

3. A process according to claim 2 wherein said acidic medium comprises acetic acid.

4. A process for the preparation of dihydroagroclavine which comprises hydrogenating elymoclavine in an acidic medium and in the presence of platinum and isolating said dihydroagroclavine.

5. A process for the preparation of dihydroagroclavine which comprises treating elymoclavine, dissolved in an acidic medium, with hydrogen under a pressure of from 1 to 4 atmospheres for from 1 to 5 hours in the presence of platinum and isolating said dihydroagroclavine.

6. A process according to claim 5 wherein said acidic medium comprises acetic acid.

References Cited in the file of this patent

Journal Agricultural Chemical Soc., Japan, vol. 28, No. 6, page 501 (1954).